(12) United States Patent
Caldwell (10) Patent No.: US 7,959,404 B2
(45) Date of Patent: Jun. 14, 2011

(54) WIND TURBINE

(76) Inventor: Dennis P. Caldwell, Borger, TX (US)

( * ) Notice: Subject to any disclaimer, the term of this patent is extended or adjusted under 35 U.S.C. 154(b) by 62 days.

(21) Appl. No.: 12/585,590

(22) Filed: Sep. 18, 2009

(65) Prior Publication Data

US 2011/0070067 A1  Mar. 24, 2011

(51) Int. Cl.
 *F03D 7/06* (2006.01)
(52) U.S. Cl. ............... 415/2.1; 416/41; 416/48; 416/51; 416/112; 416/117; 416/119; 416/136; 416/140; 416/169 R
(58) Field of Classification Search .................. 416/17, 416/41, 44, 48, 51–53, 112, 117, 119, 135–137, 416/140, 169 R; 415/2.1, 4.1–4.5, 905, 907, 415/908
See application file for complete search history.

(56) References Cited

U.S. PATENT DOCUMENTS

| | | | |
|---|---|---|---|
| 223,308 A | | 1/1880 | Barker |
| 376,357 A | | 1/1888 | Weeks |
| 690,950 A | * | 1/1902 | Hau ............................. 416/136 |
| 1,568,000 A | * | 12/1925 | Schmidt ........................ 416/17 |
| 1,651,067 A | * | 11/1927 | Nitardy ........................... 416/17 |
| 2,707,521 A | * | 5/1955 | Rogers ......................... 416/117 |
| 3,168,939 A | * | 2/1965 | Haber ....................... 416/169 R |
| 4,191,505 A | * | 3/1980 | Kaufman ....................... 415/2.1 |
| D342,074 S | | 12/1993 | Burns |
| 5,350,273 A | * | 9/1994 | Hector et al. .................. 415/4.1 |
| 5,425,619 A | * | 6/1995 | Aylor ............................ 416/117 |
| 5,591,004 A | * | 1/1997 | Aylor ........................ 416/169 R |
| 6,179,563 B1 | | 1/2001 | Minchey |
| 6,824,348 B2 | | 11/2004 | Alexander et al. |
| 6,857,846 B2 | | 2/2005 | Miller |
| 6,981,839 B2 | * | 1/2006 | Fan ................................ 415/4.1 |
| 7,748,947 B2 | * | 7/2010 | Caldwell ........................ 415/4.1 |
| 2004/0057829 A1 | * | 3/2004 | Khan .............................. 416/17 |
| 2009/0066088 A1 | * | 3/2009 | Liang ............................. 415/4.2 |

* cited by examiner

*Primary Examiner* — Christopher Verdier
(74) *Attorney, Agent, or Firm* — Stephen R. Greiner (57) ABSTRACT

A wind turbine for generating electricity has been developed. The turbine includes a housing for securement to a support. A wheel is mounted within the housing and is rotatable about a horizontal axis. The wheel has an axle assembly and a number of blade assemblies affixed thereto. Each of the blade assemblies has a frame with a spaced-apart pair of uprights and a crosspiece connecting the uprights. Each of the blade assemblies also having a pair of movable blades positioned within the frame with each of the blades being hingedly fastened to a respective one of the uprights. A brake actuator assembly is associated with each of the blades for relieving pressure imparted by strong winds on the blades. A brake operator assembly, disposed principally within said axle assembly, synchronizes the movement of the blades. An electrical current generator is connected to the wheel so as to be powered thereby.

3 Claims, 7 Drawing Sheets

WIND TURBINE

FIELD OF THE INVENTION

The present invention relates generally to fluid reaction surfaces and, more particularly to sustained ancillary movement of rotary working members, e.g., cyclic feathering, etc.

BACKGROUND OF THE INVENTION

A wind turbine is a device that utilizes the wind to power a machine. If the turbine is connected directly to the machine, such as a pump or a millstone, the turbine is usually referred to as a windmill. If the turbine is connected to a generator which, in turn, supplies a machine with electrical power the turbine is often referred to as a wind generator.

The most common wind turbine is one that rotates about a horizontal axis. Typical turbines of this type have a rotor shaft and an electrical generator positioned at the top of a tower and pointed into the wind. Small turbines are pointed by a wind vane whereas larger turbines generally use a wind sensor coupled with a motor.

The speed at which a wind turbine rotates must be controlled. Most importantly, speed control permits the aerodynamic efficiency of the turbine to be optimized for use in light winds. Also, speed control keeps a generator within its torque limits. Of equal importance, speed control allows a wind turbine to be slowed in high winds to prevent it from exceeding its own structural limits and those of its supporting tower. Finally, limiting the rotational speed of a turbine reduces the noise that it emits.

Speed control over a wind turbine is normally exerted by aerodynamic stalling and furling as well as electrical and mechanical braking. Stalling and furling, the preferred methods of slowing wind turbines, work by swiveling the turbine's blades so that either a flat side or an edge of the blades face into the wind. Electrical braking, however, requires the dumping of energy from a generator into a resistor bank, converting the kinetic energy of the turbine's rotation into heat and causing the turbine to slow down. Mechanical, drum, or disk brakes are often used to hold the turbine motionless for repair. Mechanical brakes are usually applied only after blade furling and electromagnetic braking have reduced turbine speed since mechanical brakes would wear quickly under typical loads. One major problem in designing wind turbines is getting them to slow quickly enough should a gust of wind cause sudden acceleration to unacceptable rotational speeds.

SUMMARY OF THE INVENTION

In view of the problems associated with the known apparatus employed to control the speed of wind turbines, it is a principal object of the invention to provide a wind turbine whose speed is easily and automatically controlled. In the event of strong gusts, my wind turbine automatically slows down by feathering its blades in a synchronized manner thereby avoiding potentially damaging, over-speed conditions.

It is an object of the invention to provide improved features and arrangements thereof in a wind turbine for the purpose described which is simple to construct, inexpensive to make, and dependable to use.

Briefly, my wind turbine achieves its intended object by featuring a housing for securement to an above-ground support. A wheel is mounted within the housing and is rotatable about a horizontal axis. The wheel has an axle assembly and a number of blade assemblies affixed thereto. Each of the blade assemblies has a frame with a spaced-apart pair of uprights and a crosspiece connecting the uprights. Each of the blade assemblies also having a pair of movable blades positioned within the frame with each of the blades being hingedly fastened to a respective one of the uprights. A brake actuator assembly is associated with each of the blades for relieving pressure imparted by strong winds on the blades by allowing the blades to move on hinges. A brake operator assembly, disposed principally within said axle assembly, synchronizes the movement of the blades. An electrical current generator is connected to the wheel so as to be powered thereby.

The foregoing and other objects, features, and advantages of my wind turbine will become apparent upon reviewing the following description of the turbine shown in the drawings.

BRIEF DESCRIPTION OF THE DRAWINGS

My wind turbine is described with reference to the accompanying drawings, in which.

Figure 1:
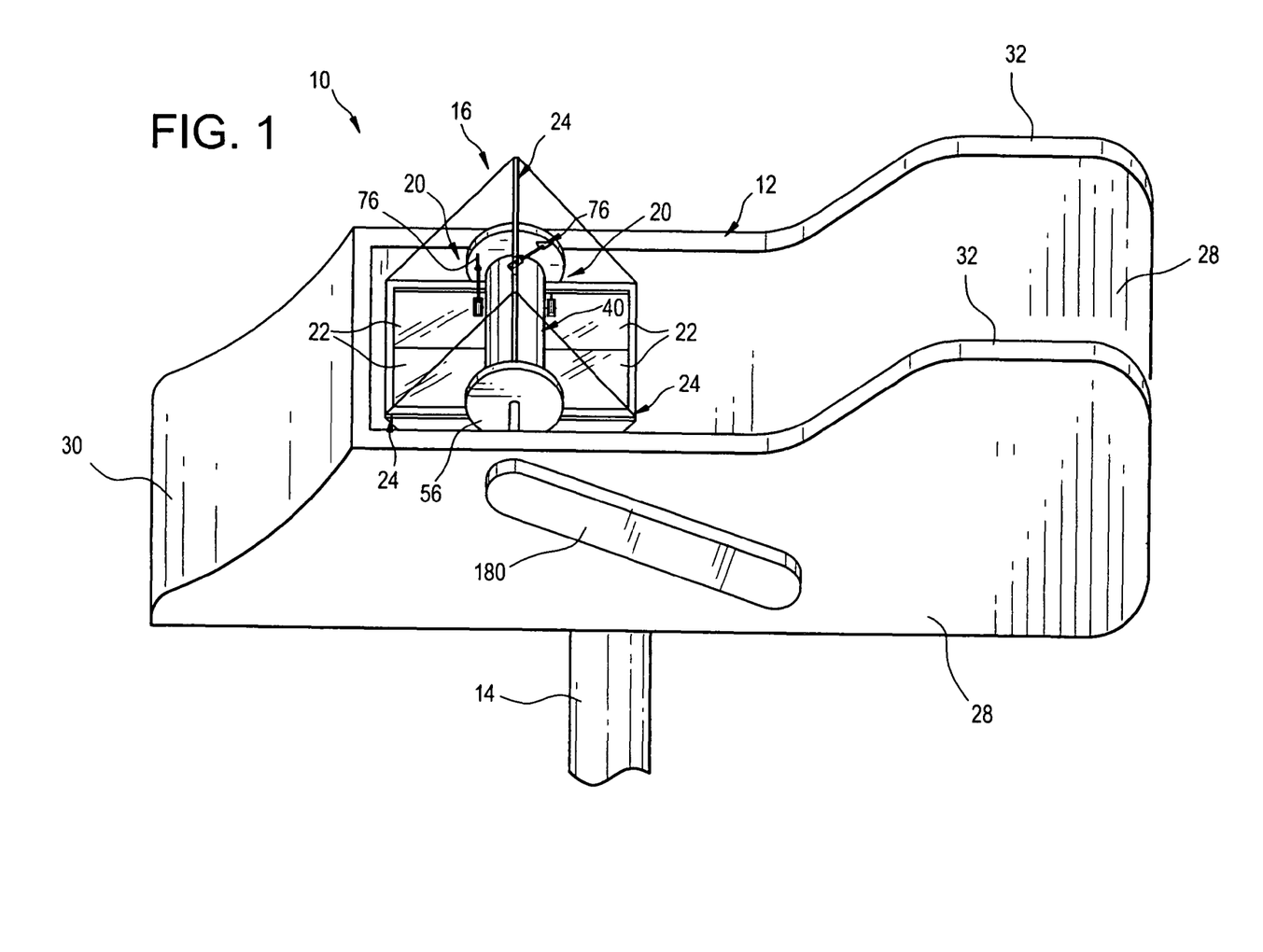
FIG. 1 is a perspective view of my wind turbine.
Figure 2:
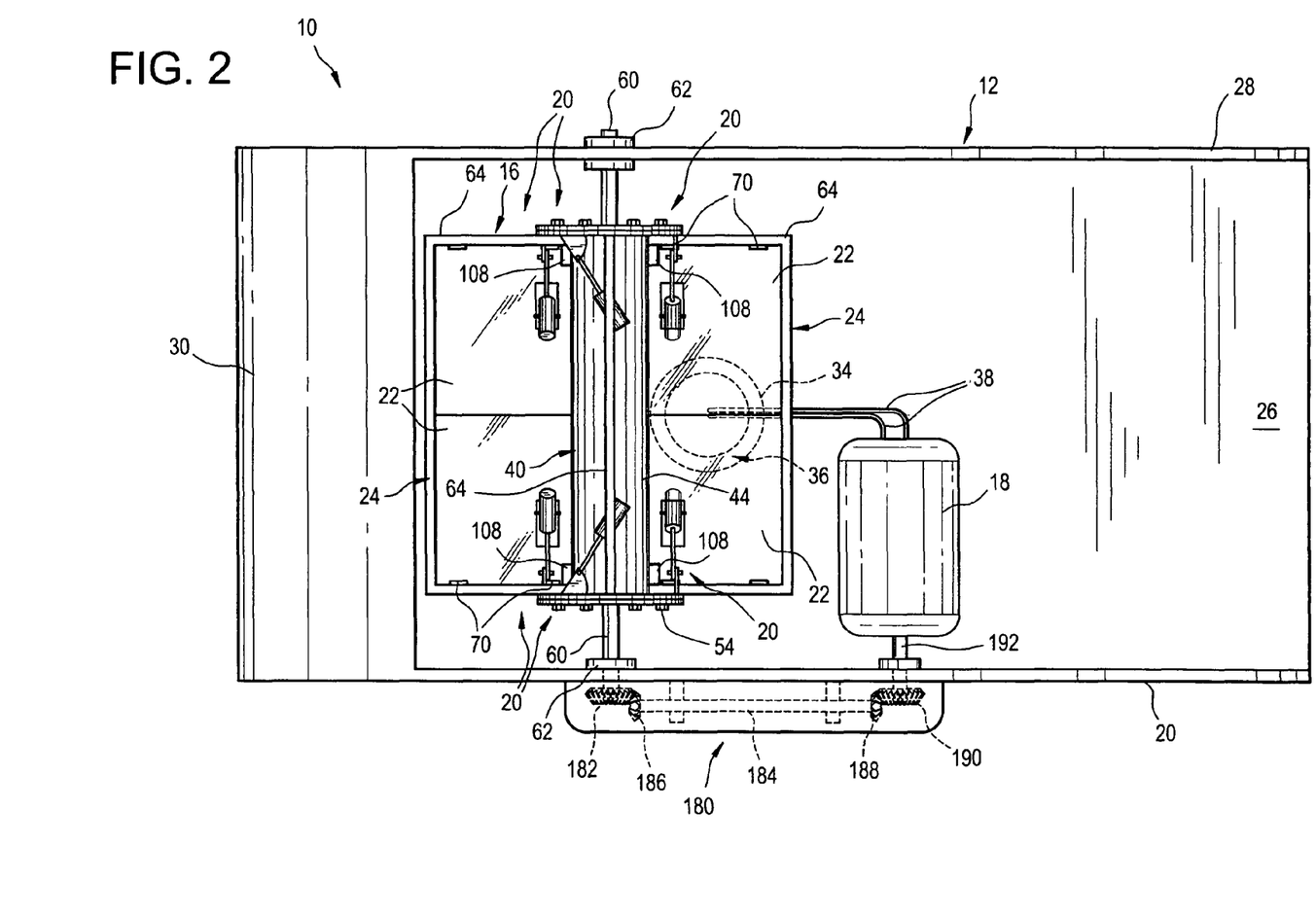
FIG. 2 is a top view of the wind turbine of FIG. 1.
Figure 3:
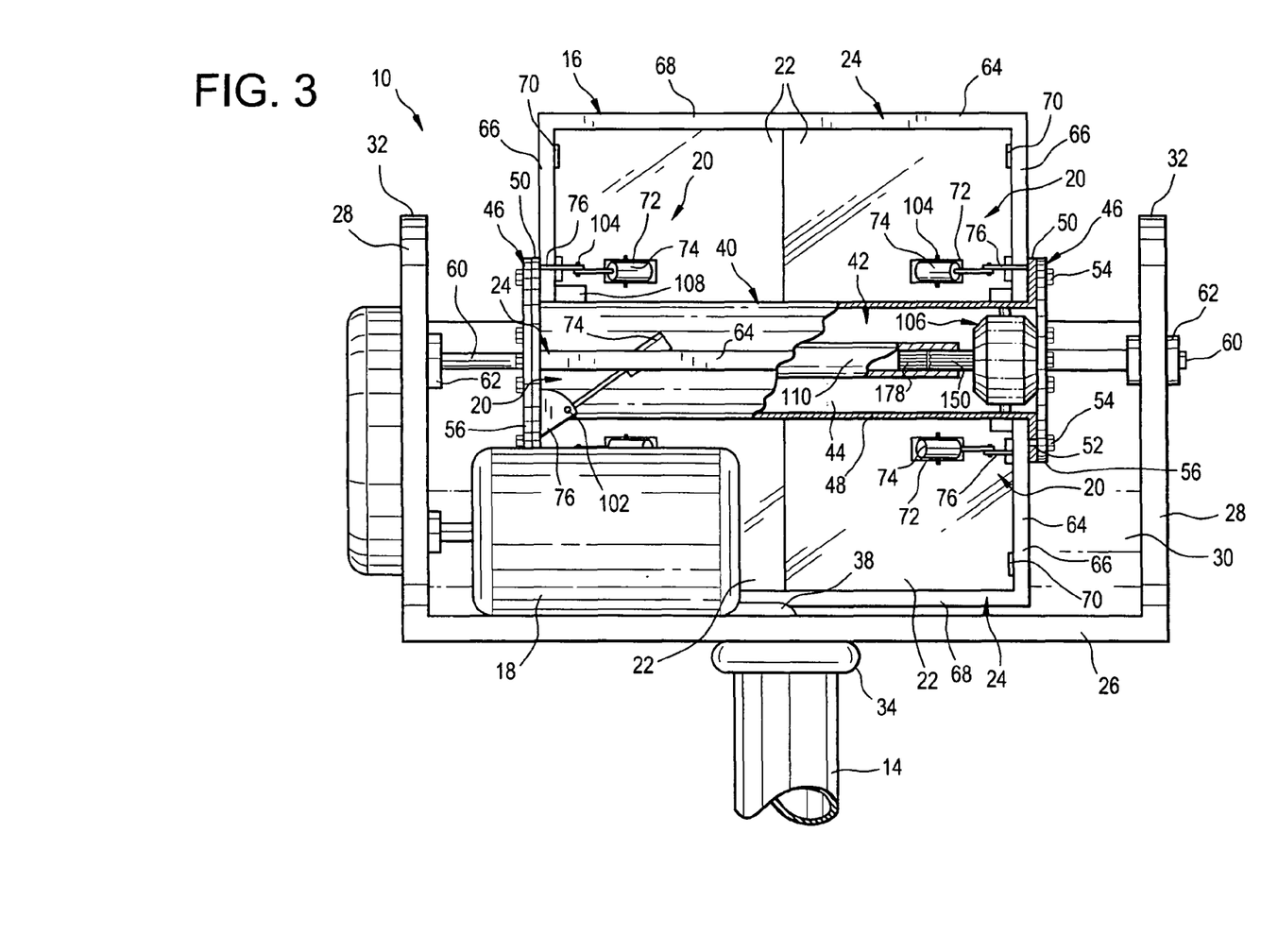
FIG. 3 is a rear view of the wind turbine.
Figure 4:
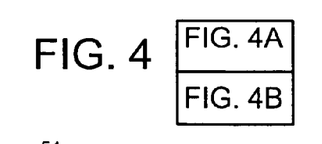
FIG. 4 is a schematic view showing the relative positions of FIGS. 4A and 4B.
Figure 4A:
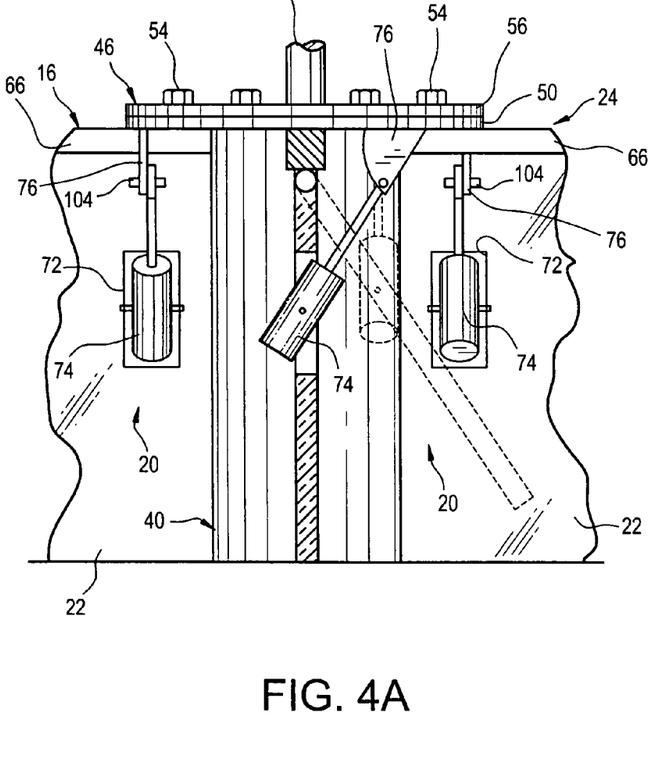
FIG. 4A is a top view of the right half of the drive shaft of the wind turbine with portions broken away to reveal details of the turbine blade feathering mechanism.
Figure 4B:
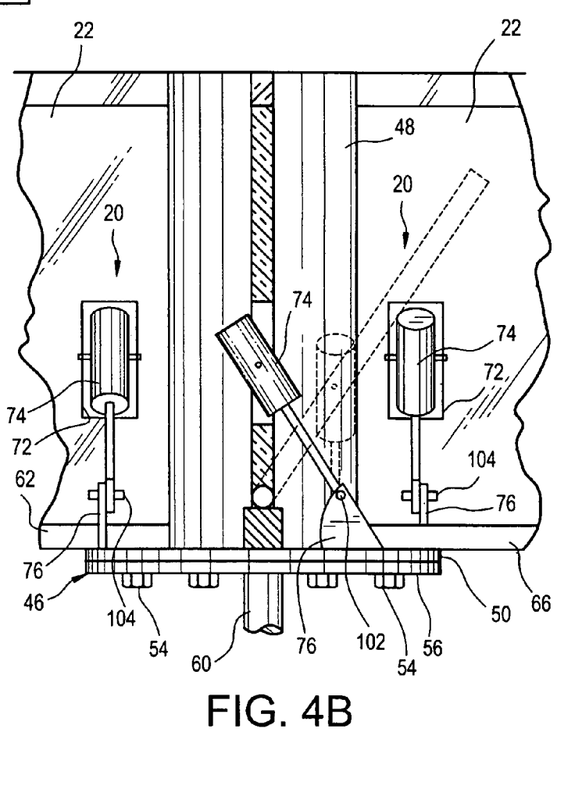
FIG. 4B is a top view of the left half of the drive shaft of the wind turbine with portions broken away to reveal details of the turbine blade feathering mechanism.
Figure 5:
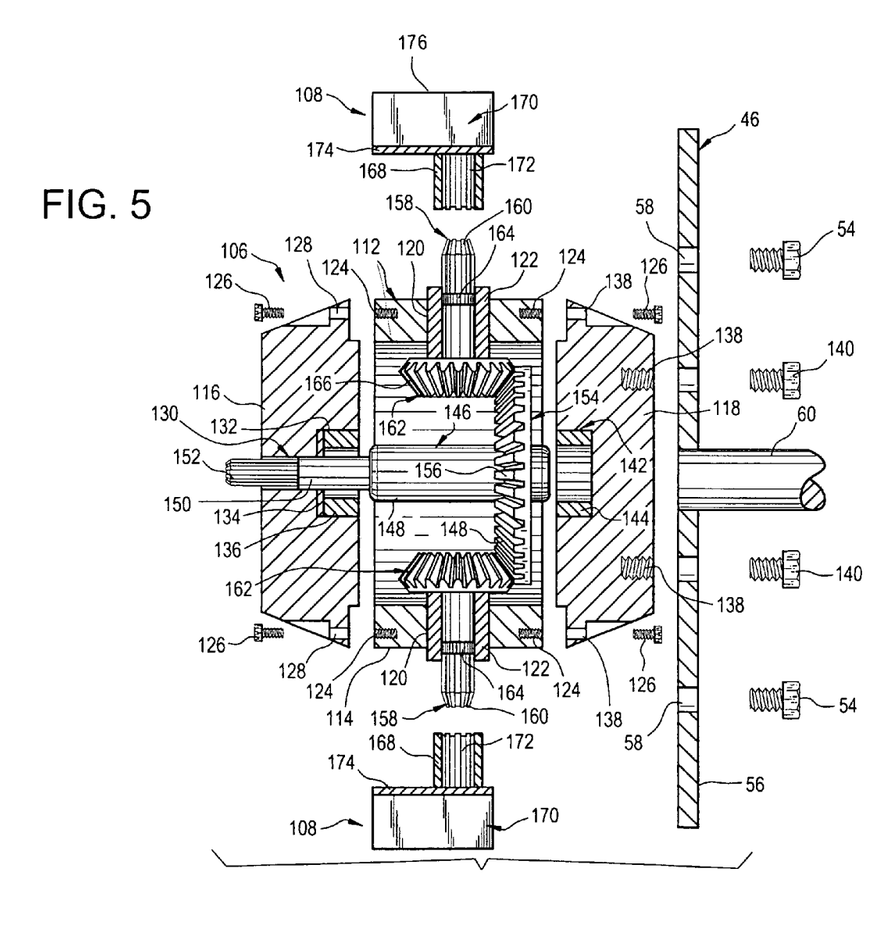
FIG. 5 is an exploded, cross-sectional view of a gearbox that synchronizes the movement of the turbine blades on one side of the wind turbine.
Figure 6:
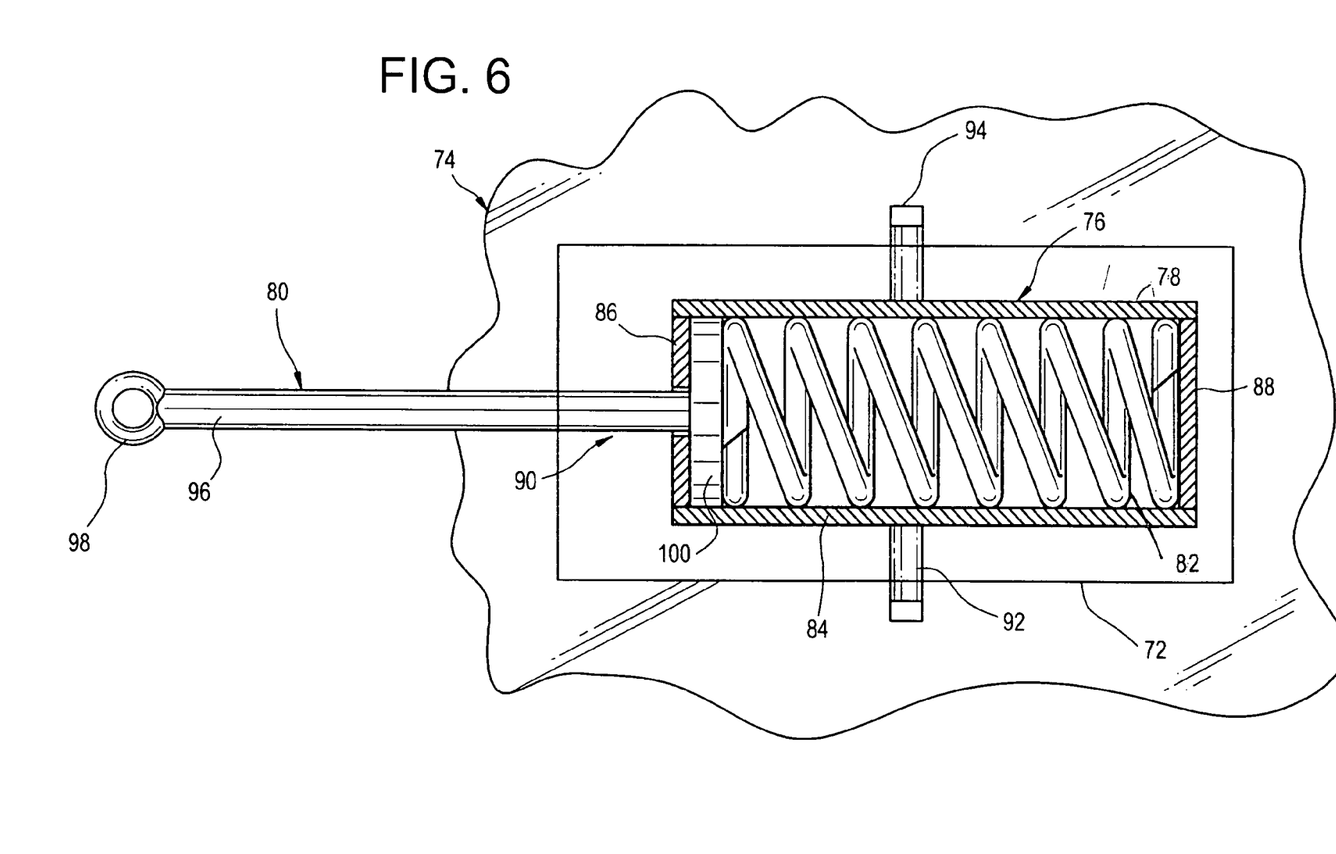
FIG. 6 is a cross-sectional view of a blade actuator that permits the feathering of turbine blades in response to strong winds.
Figure 7:
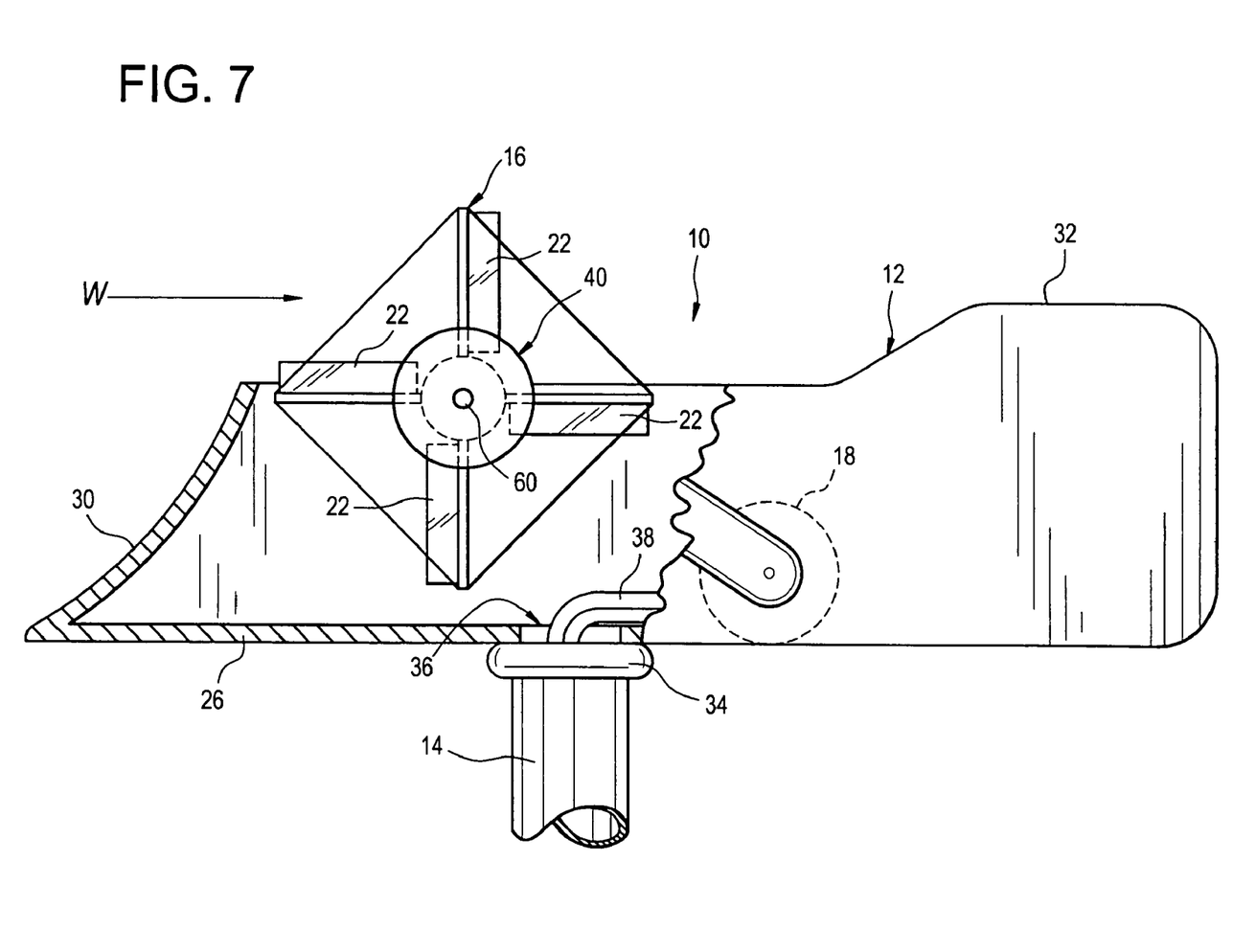
FIG. 7 is a side view of the wind turbine with portions broken away to reveal the turbine blades feathered in response to strong winds.

The reference characters denote features consistently throughout the drawings.

DETAILED DESCRIPTION OF THE INVENTION

Referring now to the FIGS., my new, wind turbine is shown generally at 10. Turbine 10 includes a housing 12 secured atop a support 14. A wheel 16, mounted within housing 12, rotates about a horizontal axis when struck by passing winds W. Wheel 16 is connected to, and drives, an electrical current generator 18 positioned within housing 12. To prevent wheel 16 from turning too fast, wheel 16 is outfitted with a number of brake actuator assemblies 20 that automatically feathers the paired blades 22 of each blade assembly 24 when such are struck by winds W that are too strong.

Housing 12 includes a rectangular bottom wall 26 to the opposite sides of which a pair of side walls 28 is connected and extends upwardly. The front ends of side walls 28 slope upwardly and rearwardly from their junctions with bottom wall 26. A front wall 30 is connected to front ends of both bottom wall 26 and side walls 28. As shown, side walls 28 support front wall 30 so that it slopes upwardly and rearwardly at a shallow angle. The rear end of each of side walls 28 is provided with an upward extension 32 that serves as a rudder in winds W.

Bottom wall 26 is connected by a swivel bearing 34 to the top of support 14, a hollow post, that supports wind turbine 10 above the ground. Swivel bearing 34 is positioned midway between side walls 28 to achieve good side-to-side balance of turbine 10. Additionally, swivel bearing 34 is positioned close enough to the front of housing 12 so that winds W will tend to swing extensions 32 downwind and cause front wall 30 to face directly into winds W.

Swivel bearing 34 has an opening 36 in its center that permits a pair of electrical leads 38, discussed below, to extend from generator 18 into support 14 and, then, to the ground in an enclosed manner. If desired, a swiveling electrical connector, similar to the alternator provided in an automobile, can be provided to leads 38 to prevent them from tangling as wind turbine 10 pivots on swivel bearing 34 in response to winds W.

Wheel 16 is put together from several groups of working parts or assemblies. An axle assembly 40 attaches wheel 16 to housing 12 and permits wheel 16 to turn. A number of blade assemblies 24 radiate outwardly from axle assembly 40 to catch winds W. Each blade assembly 24 carries a pair of brake actuator assemblies 20 that automatically opens the associated blade assembly 24 to permit the passage of winds W when the speed of winds W is excessive. The brake actuator assemblies 20 are interconnected so as to work in unison by a brake operator assembly 42 mounted within axle assembly 40.

Axle assembly 40 includes a hollow body 44 whose opposed ends are sealed by hub caps 46. Hollow body 44 comprises a tube 48 having a peripheral flange 50 surrounding each of its opposed, open ends. Each flange 50 is provided with a number of spaced-apart holes 52 sized for the passage of threaded fasteners 54 that connect a hub cap 46 to one end of tube 48. Each hub cap 46 comprises a disk 56 with a number of holes 58 also sized to receive threaded fasteners 54. Holes 58 are spaced around the periphery of disk 56 for registration with holes 52 in a flange 50. A spindle 60 is affixed to, and extends outwardly from, the center of each disk 56. Spindles 60 are adapted for positioning, and rotating, in journal bearings 62 affixed to side walls 28.

Four blade assemblies 24 are affixed to, and carried for rotation within, housing 12 by axle assembly 40. Each blade assembly 24 includes a rectangular, blade frame 64 that carries a pair of movable blades 22 within its confines. A blade frame 64 has a pair of uprights 66 that are affixed at their inner ends to each of the opposite ends of tube 48. Uprights 66 radiate outwardly from tube 48 and terminate at outer ends remote from tube 48. The outer ends of uprights 66 are connected together by a crosspiece 68. The crosspieces 68 are shown in the FIGS. to be about twice as long as uprights 66, but can have any suitable dimensions.

Each of blades 22 is formed of lightweight, yet durable, plastic or other suitable material. As shown, each blade 22 is rectangular in outline and is dimensioned to fill about one-half of the area bounded by frame 64. The outside edge of each blade 22 is connected by a pair of hinges 70 to an adjacent upright 66 such that the blade 22 can "feather" or pivot on the upright 66. (Together, a pair of blades 22 will swing open like barn doors when subjected to high winds W.) The inside edge of each blade 22 is positioned closely adjacent the inside edge of the adjacent blade 22 of a pair and roughly bisects its associated frame 64. The top edge of each blade 22 is positioned close to a crosspiece 68 and the bottom edge of each blade 22 falls close to tube 48. A small, rectangular window 72 is provided in each blade 22 proximate the bottom edge thereof.

Each blade 22 is moved with a blade actuator assembly 20 that allows it to pivot downwind to relieve the pressure imparted by strong winds W and slow the turning of wheel 16. Each actuator assembly 20 has a blade actuator 74 connected to an anchor bracket 76. Each blade actuator 74 is carried by a blade 22 and each anchor bracket 76 is affixed to one of flanges 50.

Blade actuator 74 has a hollow body 78 from which an actuator arm 80 is urged outwardly by a compressed, coiled spring 82. Body 78 is a tube 84 whose opposite ends are closed by caps 86 and 88 with cap 86 being provided with an outlet opening 90 at its center. A pair of pivot pins 92 is affixed to the middle of tube 84 and projects upwardly and downwardly therefrom. During the assembly of wind turbine 10, pins 92 are set for rotation in close fitting sockets 94 located above and below window 72 in each of blades 22. Actuator arm 80 has a rod 96 that slidably extends through opening 90. A ring 98 is affixed to the outer end of rod 96 outside of body 78. A biasing plate 100 is affixed to the inner end of rod 96 and is sized to slide within tube 84. Spring 82 is disposed between biasing plate 100 and cap 88 to normally keep rod 96 extended from body 78.

The resiliency of springs 82 is important to the operation of wind turbine 10. If spring 82 is highly resilient, blades 22 will be permitted to pivot in winds W of low speeds thereby wheel 16 to low speed operation. If spring 82 is relatively stiff, blades 22 will pivot only in strong winds W and wheel 16 will rotate at great rotational speeds.

It is believed that springs 82 can be supplemented or replaced by other things. For example, pneumatic devices are well known in the shock absorber art for dampening the movement of springs such as the one shown at 82. Pneumatic chambers also serve as substitutes for springs in some products. Similarly, resilient rubber and foam materials are excellent spring equivalents. All can be deployed in a blade actuator 74 to permit movement of actuator arm 80 in response to a force generated by winds W and, then, return arm 80 to its starting position when the force is gone.

Four anchor brackets 76 are affixed to the inner surface of each flange 50. Each of brackets 76 is generally triangular in shape and is provided with a hole 102 in its free corner remote from flange 50. A pin or link 104 is passed through hole 102 and ring 98 to pivotally connect actuator arm 80 to axle assembly 40.

Brake operator assembly 42 has a pair of gear boxes 106 affixed within the opposite ends of tube 48. A number of levers 108 radiate from each gear box 106 and engage the bottom edge of adjacent blades 22. Gear boxes 106 are connected for synchronous operation by a connector shaft 110.

Each gear box 106 has a cover 112 including a cylinder 114 whose opposite ends are closed by plugs 116 and 118. Cylinder 114 has four, radial openings 120 oriented 90° apart within which bushings 122 are set. A number of threaded bores 124 are provided in each end of cylinder 114 for receiving threaded fasteners 126 that releasably join plugs 116 and 118 to cylinder 114.

Plug 116 is circular in outline and is provided with a number of bores 128 around its periphery for the registration with bores 124 and the passage of fasteners 126. Plug 116 has a central opening 130 with an enlarged, countersunk portion 132 at its inner side. Countersunk portion 132 is sized to receive both a weather-resistant seal 134 and a bushing 136.

Plug 118 is circular and is provided with a number of bores 138 around its periphery for registration with bores 124 and the passage of fasteners 126. Additional, threaded bores 138 are provided in plug 118 for receiving threaded fasteners 140 that attach a gear box 106 to a disk 56. Plug 118 has a central opening 142 that is sized to receive a bushing 144.

An actuator rod 146 extends through the center of each gear box 106. Actuator rod 146 has a large-diameter, load-bearing portion 148 and a smaller-diameter, driving portion 150 affixed to, and extending from, one end of load-bearing portion 148. One end of load-bearing portion 148 is snugly, yet rotatably, fitted within bushing 136. The other end of load-bearing portion 148 is snugly, yet rotatably, fitted within bushing 144. The inner end of driving portion 150 is affixed to load bearing portion 148 and is rotatably fitted within seal 134. The outer end of driving portion 150 is rotatably fitted within central opening 130 and projects outwardly therefrom. The outer end of driving portion 150 has a grooved or splined surface 152 for engagement with one end of connector shaft 110.

Affixed to load-bearing portion 148 is a bevel gear 154. The pitch surface shape and pitch angle of bevel gear 154 are a matter of design choice. However, bevel gear 154 has a preferred pitch angle of less than 90° and is, therefore, coneshaped. This type of bevel gear has gear teeth 156 that teeth point outward.

One of four, actuator pins 158 is snugly, yet rotatably, fitted within each of bushings 122. Each actuator pin 158 has a grooved or splined surface 160 at its outer end for engagement with one of levers 108. Also, each actuator pin 158 carries a miter gear 162 at its inner end for engagement with bevel gear 154. Between its opposite ends, each actuator pin 158 carries a weatherproof seal 164.

Miter gears 162 are affixed to actuator pins 158 so as to rotate therewith. Miter gears 162 all have equal numbers of gear teeth 166, that number being smaller than the number of gear teeth 156 and being a matter of design choice. The pitch surface shape and pitch angle of miter gears 162 correspond with that of bevel gear 154. Teeth 166 mate with teeth 156 such that gears 162 and 154 rotate together on axes oriented at right angles to one another.

Each of levers 108 includes a socket portion 168 for engagement with an actuator pin 158 and a bracket portion 170 for engagement with a blade 22. Socket portion 168 is a tube sized to snugly receive an actuator pin 158. The inner surface 172 of the tube is grooved or splined to grip the splined surface 160 of an actuator pin 158 received therein. Bracket portion 170 is U-shaped in cross section, having a cross member 174 and a pair of upright members 176 that are affixed to, and project outwardly from the opposite sides of cross member 174. Upright members 176 are spaced widely enough apart to snugly receive the bottom edge of a blade 22 therebetween.

Connector shaft 110 is a hollow pipe that extends through tube 48 to connect gear boxes 106 together. Connector shaft 110 has openings 178 at its opposite ends for receiving the driving portions 150 extending from gear boxes 106. Openings 178 are grooved or splined around their peripheries so that rotational movement of actuator rods 146 is imparted to connector shaft 110 and vise versa.

A power coupling 180 transmits kinetic energy from the rotating wheel 16 to the electrical generator 18. Coupling 180 comprises a bevel gear 182 affixed to the outer end of one of spindles 60 so as to turn with the spindle 60. A power transmission shaft 184, suitably supported at an incline for rotation on the exterior of a side wall 28, carries a miter gear 186 at its upper end that mates with bevel gear 182. The shaft 184 carries another miter gear 188 at its lower end that mates with a bevel gear 190 carried on the outer end of a drive shaft 192 extending through side wall 28 from generator 18. Thus, through gears 182, 186, 188 and 190, the rotational movement of a spindle 60 is carried to drive shaft 192 causing generator 18 to produce an electrical current.

The exact type of power coupling utilized with wind turbine 10 is not critical to the operation of wind turbine 10. In this regard, it is believed that at least two other types of couplings can be used with equal facility. For example, a belt and pulley arrangement can be used instead of a gear drive. Additionally, a hydraulic pump can be used to circulate a pressurized liquid to perform work. A suitable pumping arrangement is described in a recently published patent application filed by me.

The configuration of housing 12 and wheel 16 ensures that winds W only contact blade assemblies 24 extending upwardly from housing 12, above side walls 28 and front wall 30 at a given point in time. Front wall 30 directs winds W upwardly so that they cannot contact blade assemblies 24 positioned between side walls 28 and reduce the angular momentum of wheel 16.

Wind turbine 10 operates automatically after its set up in a location where winds W blow with a sufficient consistency and velocity. With winds W blowing, extensions 32 serve to orient front wall 30 so that it faces directly into winds W. Winds W pass over front wall 30 and strike the blade assemblies 24 projecting above front wall 30, thus rotating wheel 16 and driving generator 18 so as to produce an electrical current. The current made by generator 18 can be harnessed by remote electrical devices to do useful work.

Should winds W have a velocity that is predetermined by an operator to be excessive or harmful to wind turbine 10, springs 82 associated with the pair(s) of blades 22 receiving the most pressure from winds W will compress. The continued compression of these springs 82 will result in the pivoting movement of blades 22 on hinges 70. The pivoting movement of the wind-blown blades 22 is, then, transmitted through levers 108 into the paired gearboxes 106. Since all of blades 22 are connected together through gearboxes 106 and connector shaft 110, the blades 22 not directly encountering winds W at a particular moment will pivot the same amount as windblown blades 22. With the movement of all blades 22 being synchronized, wheel 16 remains balanced and vibration free as it rotates.

As the velocity of winds W decrease, springs 82 drive actuator arms 80 to their fullest extents from hollow bodies 78. In this state, the paired blades 22 of each blade assembly 24 are oriented in a coplanar configuration. Winds W striking blade assemblies 24 do so with optimum efficiency. In the event of a sudden surge in the velocity of winds W, however, brake actuator assemblies 20 instantaneously respond by feathering blades 22 to reduce their surface area exposed to winds W in the way that a clipper ship captain might take down some sails in a gale. Thus, wind turbine 10 is automatic in its operation and failsafe.

Actuators Bodies can be Pneumatic Rubber, have Shock Dampening ets.

While wind turbine 10 has been described with a high degree of particularity, it will be appreciated by those skilled in the field that modifications can be made to it. For example, side walls 28 can be reinforced with the addition of braces to support a wheel of practically any size. Also, supplemental brakes of disk-, drum-, or caliper-type can be added to spindles 60 to lock wheel 16 in place for repairs or to further limit the speed of wheel 16 in response to hurricane-force winds W. Of course, the number and angular orientation of blade assemblies 24 on axle assembly 40 can be varied to increase or decrease the efficiency at which turbine 10 harnesses winds W. Therefore, it is to be understood that the present invention is not limited merely to wind turbine 10 described above, but encompasses any and all wind turbines within the scope of the following claims.

I claim:

1. A wind turbine, comprising:

a housing being adapted for securement atop a support;

a wheel being mounted within said housing and being rotatable about a horizontal axis when struck by winds passing over the front of said housing, said wheel including:

an axle assembly having a tube with sealed ends and a pair of spindles each of which extending laterally from a respective one of said sealed ends of said tube, said axle assembly also having a pair of peripheral flanges being affixed to said tube and each being positioned adjacent a respective one of said sealed ends;

a plurality of blade assemblies being affixed to said axle assembly, each of said blade assemblies having a frame with a spaced-apart pair of uprights radiating outwardly from said tube and a crosspiece connecting said uprights together at a distance away from said tube, each of said blade assemblies also having a pair of movable blades positioned within said frame with each of said blades being hingedly fastened to a respective one of said uprights;

a plurality of brake actuator assemblies for relieving the pressure imparted by strong winds on said blades, each of said actuator assemblies having a blade actuator with an actuator body being affixed to a respective one of said blades and an actuator arm being slidably engaged with said actuator body and being pivotally connected to a respective one of said peripheral flanges, and said blade actuator further having a spring disposed within said actuator body and being engaged with said actuator arm for extending said actuator arm from said actuator body, a brake operator assembly for synchronizing the pivoting movement of said blades, said brake operator assembly including a pair of gear boxes being affixed within said tube and being operatively connected together by a connector shaft also being positioned within said tube, each of said gear boxes being connected to said blades positioned adjacent a respective one of said sealed ends such that the pivoting movement of one said blade is transmitted to all of said blades through said gear boxes; and, an electrical current generator being connected to said wheel so as to be powered thereby.

2. The wind turbine according to claim 1 wherein said each said actuator body is pivotally fastened to a respective one of said blades.

3. The wind turbine according to claim 1 further comprising;

a first bevel gear being affixed to one of said spindles;

a first miter gear being mated with said first bevel gear;

a power transmission shaft having opposed ends, one of said opposed ends being affixed for rotation to said first miter gear;

a second miter gear being affixed for rotation to said opposed end of said power transmission shaft remote from said first miter gear;

a second bevel gear being mated with said second miter gear; and, wherein said electrical current generator is connected to said second bevel gear.

* * * * *